United States Patent
Kim et al.

(10) Patent No.: US 8,385,725 B2
(45) Date of Patent: Feb. 26, 2013

(54) METHOD OF THE APPARATUS FOR RECORDING DIGITAL MULTIMEDIA BASED ON BUFFERING STATES OF THE MULTIMEDIA SERVICE

(75) Inventors: Kwang-Hyuk Kim, Suwon-si (KR); Sung-Chang Ha, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 265 days.

(21) Appl. No.: 12/919,689

(22) PCT Filed: Feb. 26, 2008

(86) PCT No.: PCT/KR2008/001092
§ 371 (c)(1),
(2), (4) Date: Aug. 26, 2010

(87) PCT Pub. No.: WO2009/107881
PCT Pub. Date: Sep. 3, 2009

(65) Prior Publication Data
US 2010/0329647 A1    Dec. 30, 2010

(51) Int. Cl.
*H04N 5/92* (2006.01)
*H04N 5/76* (2006.01)
(52) U.S. Cl. .................. 386/326; 386/298; 386/341
(58) Field of Classification Search .............. 386/326, 386/334, 341, 353, 324, 323, 298
See application file for complete search history.

(56) References Cited

U.S. PATENT DOCUMENTS

2003/0228140 A1 * 12/2003 Bullock et al. ............... 386/125
2007/0130498 A1    6/2007 Hannuksela et al.
2007/0274376 A1   11/2007 Jang et al.

FOREIGN PATENT DOCUMENTS

EP           1 775 865           4/2007
KR       1020030033381          5/2003

OTHER PUBLICATIONS

PCT/ISA/237 Written Opinion issued in PCT/KR2008/001092 (4pp).
PCT/ISA/210 International Search Report (3pp).

* cited by examiner

*Primary Examiner* — Robert Chevalier
(74) *Attorney, Agent, or Firm* — The Farrell Law Firm, P.C.

(57) ABSTRACT

Provided are a method and apparatus for recording digital multimedia by buffering. The method includes performing buffering with regard to each of a plurality of received multimedia services in a predetermined output mode; managing buffering information relating to buffering settings with regard to each of the buffered multimedia services; and controlling output of a corresponding multimedia service according to the buffering information, wherein the output mode comprises a time shift mode where a previously buffered multimedia service is called and reproduced and a background mode where a currently received multimedia service is buffered without being displayed on a screen.

33 Claims, 6 Drawing Sheets

METHOD OF THE APPARATUS FOR RECORDING DIGITAL MULTIMEDIA BASED ON BUFFERING STATES OF THE MULTIMEDIA SERVICE

PRIORITY

This application is a National Stage filing of International Application No. PCT/KR2008/001092, filed on Feb. 26, 2008, the disclosure of which is incorporated herein in its entirety by reference.

BACKGROUND

1. Field of the Invention

The present invention generally relates to a method and apparatus for recording digital to multimedia, and more particularly, to a method and apparatus for buffering a received multimedia service, managing a buffering status, and reproducing or recording the multimedia service.

2. Description of the Related Art

Digital multimedia reproduction and recording systems use buffering when receiving a multimedia service in order to realize a time shill mode and a background mode. Since a multimedia service is buffered, stored, and processed, a result of processing the multimedia service is determined based on a buffering status of the multimedia service.

FIG. 1A is a dataflow diagram of a buffering mechanism of a recording controller 110 and a service receiver 120 during a time shift mode in a conventional OpenCable Application Platform (OCAP) digital video recording system 100.

Referring to FIG. 1A, the conventional OCAP digital video recording system 100 registers a time shift event listener in order to determine whether the recording controller 110 changes a buffering status in the time shift mode in step 130. The recording controller 110 instructs the service receiver 120 to start buffering with regard to the time shift mode in step 140. The service receiver 120 transmits time shill event information to the recording controller 110 in step 150.

The time shift event information includes information about whether a multimedia service provided in the time shift mode is buffered, whether the buffering is detected, and whether a basic property of the time shift mode is changed. The time shift event information may confirm whether buffering with regard to the time shill mode starts or ends.

FIG. 1B is a dataflow diagram of a buffering mechanism of the recording controller 110 and the service receiver 120 during a background mode in the conventional OCAP digital video recording system 100.

Referring to FIG. 1B, the time shift event information includes information about buffering with regard to the time shift mode, not with regard to the background mode. Since the recording controller 110 of the conventional OCAP digital video recording system 100 registers an event listener regarding buffering with regard to the time shift mode in step 130. although the recording controller 110 instructs the service receiver 120 to start buffering with regard to the background mode in step 160, the service receiver 120 has no response to start to buffering with regard to the background mode in step 170. Therefore, information about a buffering status, such as starting or ending of buffering with regard to the background mode, may not be confirmed.

FIG. 2 is a dataflow diagram of a buffering request list mechanism of the recording controller 110 and the service receiver 120 in the conventional OCAP digital video recording system 100.

Referring to FIG. 2, the recording controller 110 of the conventional OCAP digital video recording system 100 may send a request to the service receiver 120 for a buffering request list of a multimedia service for which a buffering start request is made in order to determine whether buffering has started in step 210. The service receiver 120 may provide the recording controller 120 with the buffering request list in step 220.

If the buffering start request with regard to the background mode was made, since such a fact is described in the buffering request list, the buffering start request with regard to the background mode may be confirmed. However, information about whether buffering with regard to the background mode has started or not may not be confirmed. Therefore, lithe buffering start request is made or a buffering event occurs when buffering with regard to the background mode has not started, the buffering start request or the buffering event may not be processed.

SUMMARY OF THE INVENTION

The present invention provides a method and apparatus for managing a buffering status of a multimedia service in all output modes when the multimedia service is processed in an output mode, such as a time shift mode or a background mode, in a digital multimedia reproducing and recording system.

The present invention also provides a method and apparatus for controlling an output, such as reproduction or recording of a multimedia service, according to a buffering status of the multimedia service by managing a buffering processing status or determining whether the buffering status has changed.

According to an aspect of the present invention, there is provided a method for recording digital multimedia, which includes performing buffering with regard to each of a plurality of received multimedia services in a predetermined output mode; managing buffering information to relating to buffering settings with regard to each of the buffered multimedia services: and controlling output of a corresponding multimedia service according to the buffering information, wherein the output mode includes a time shill mode where a previously buffered multimedia service is called and reproduced and a background mode where a currently received multimedia service is buffered without being displayed on a screen.

The buffering information may include buffering progress status information with regard to each of the buffered multimedia services, wherein the buffering progress status information includes at least one of a buffering start request, a buffering start cancellation, a buffering in progress, a buffering initialization, and a buffering failure as a buffering progress status of the corresponding multimedia service.

The buffering information may include buffering start request list information including a list of multimedia services for which a buffering start request is made among the buffered multimedia services, wherein the buffering start request list information comprises the buffering progress status information with regard to each of the multimedia services.

The buffering information may include buffering event information with regard to the buffered multimedia services, wherein the buffering event information includes buffering event type information about whether at least one of a buffering status, a buffering service type, and buffering continuation period of time with regard to each of the multimedia services is changed.

The buffering information may include buffering event information with regard to the buffered multimedia services, wherein the buffering event information includes the buffering event type information about whether at least one of the buffering status, the buffering service type, and buffering continuation period of time with regard to each of the multimedia services is changed, and the buffering start request list information.

The method may further include determining a predetermined operation to be processed with regard to the buffered multimedia services by using the buffering information.

The managing of the buffering information may include determining whether a buffering status of each of the buffered multimedia services has changed; if the buffering status has changed, updating the buffering information according to the changed buffering status; and outputting the updated buffering information.

The controlling of the output of the corresponding multimedia service may include obtaining the buffering event information from the buffering information, wherein the buffering event information comprises the buffering event type information.

The controlling of the output of the corresponding multimedia service may further include obtaining the buffering start request list information from the buffering information.

The controlling of the output of the corresponding multimedia service may further include obtaining buffering progress status information with regard to a predetermined multimedia service from the buffering start request list information, wherein the buffering start request list information comprises the buffering progress status information with regard to each of the multimedia services.

The managing of the buffering information may include if a predetermined buffering start request input is confirmed, updating the buffering start request list information; and outputting the updated buffering start request list information, wherein the buffering start request list information includes the list of multimedia services for which the buffering start request is made among the buffered multimedia services.

The managing of the buffering information may include service discontinuation section information including at least one of information about a reason for buffering discontinuation, information about buffering discontinuation time, and information about a buffering discontinuation section location in the buffering discontinuation section, if a predetermined multimedia service is divided into a first section before the buffering discontinuation section, a second section after the buffering discontinuation section, and the buffering discontinuation section due to an instant buffering error.

The controlling of the output of the corresponding multimedia service may further include detecting the buffering discontinuation section by using the service discontinuation section information and the buffering information: and continuously reproducing a multimedia service in the first section, and a multimedia service in the second section, except for the buffering discontinuation section.

The controlling of the output of the corresponding multimedia service may further include detecting the buffering discontinuation section by using the service discontinuation section information and the buffering information: and writing the multimedia service in the first section. the multimedia service in the second section, and information about the buffering discontinuation section.

According to another aspect of the present invention, there is provided an apparatus for recording digital multimedia, the apparatus including a service buffering unit performing buffering with regard to each of a plurality of received multimedia services in a predetermined output mode: a buffering information managing unit managing buffering information relating to buffering settings with regard to each of the buffered multimedia services: and a service controller controlling output of a corresponding multimedia service according to the buffering information, wherein the output mode includes a time shill mode where a previously buffered multimedia service is called and reproduced and a background mode where a currently received multimedia service is buffered without being displayed on a screen.

According to another aspect of the present invention, there is provided a computer readable recording medium having recorded thereon a program for executing the method of recording digital multimedia.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Hereinafter, the present invention will be described in detail by explaining embodiments of the invention with reference to the attached drawings.

Figure 1A:
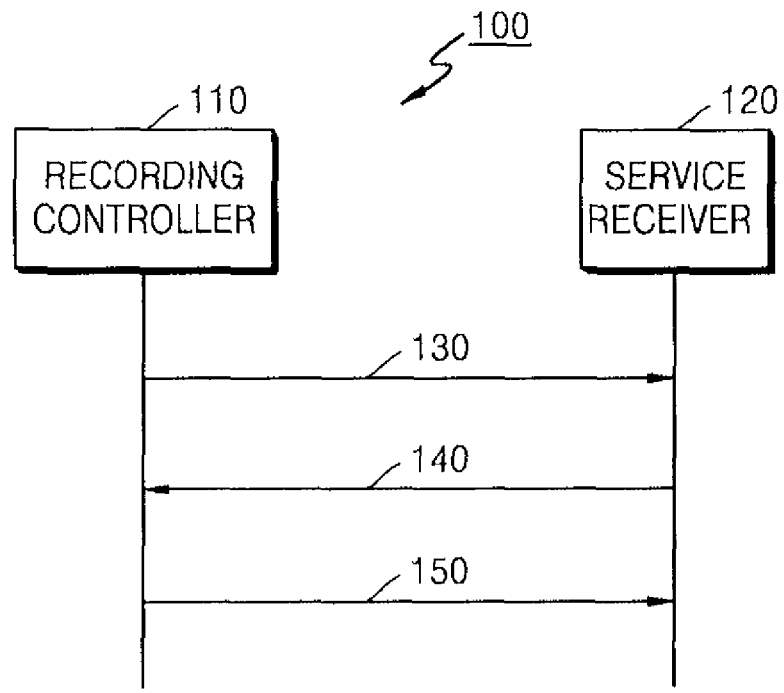
FIG. 1A is a dataflow diagram of a buffering mechanism of a recording controller and a service receiver during a time shift mode in a conventional OpenCable Application Platform (OCAP) digital video recording system.
Figure 1B:
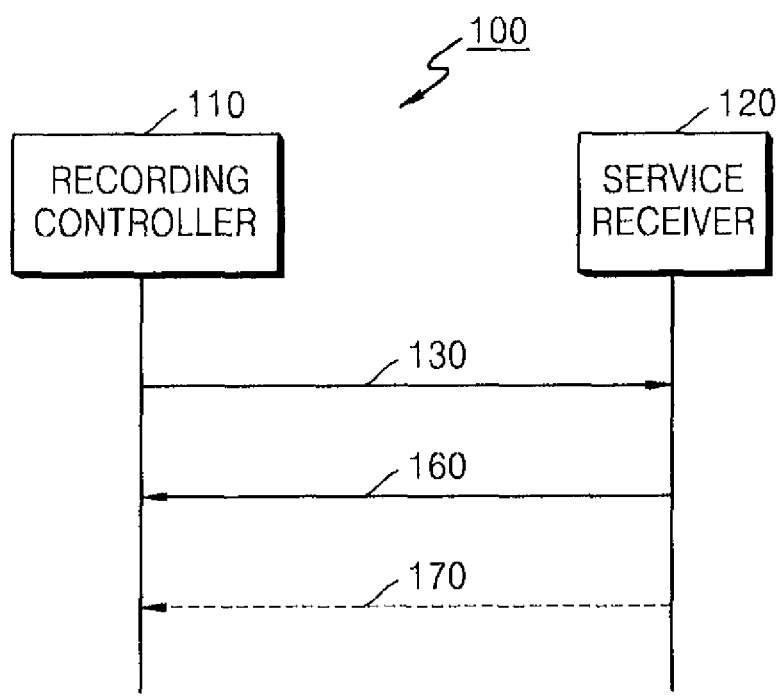
FIG. 1B is a dataflow diagram of a buffering mechanism of the recording controller and the service receiver during a background mode in the conventional OCAP digital video recording system.
Figure 2:
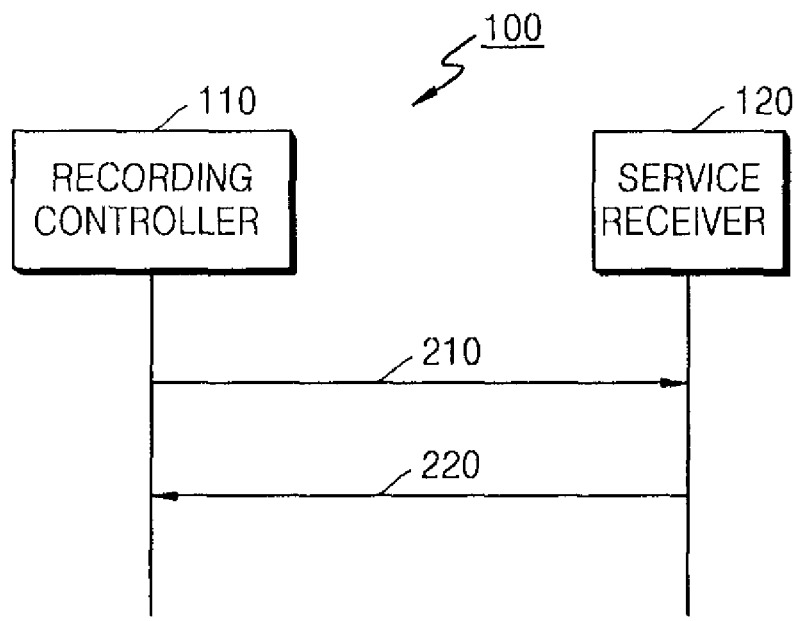
FIG. 2 is a dataflow diagram of a buffering request list mechanism of the recording controller and the service receiver in the conventional OCAP digital video recording system.
Figure 3:
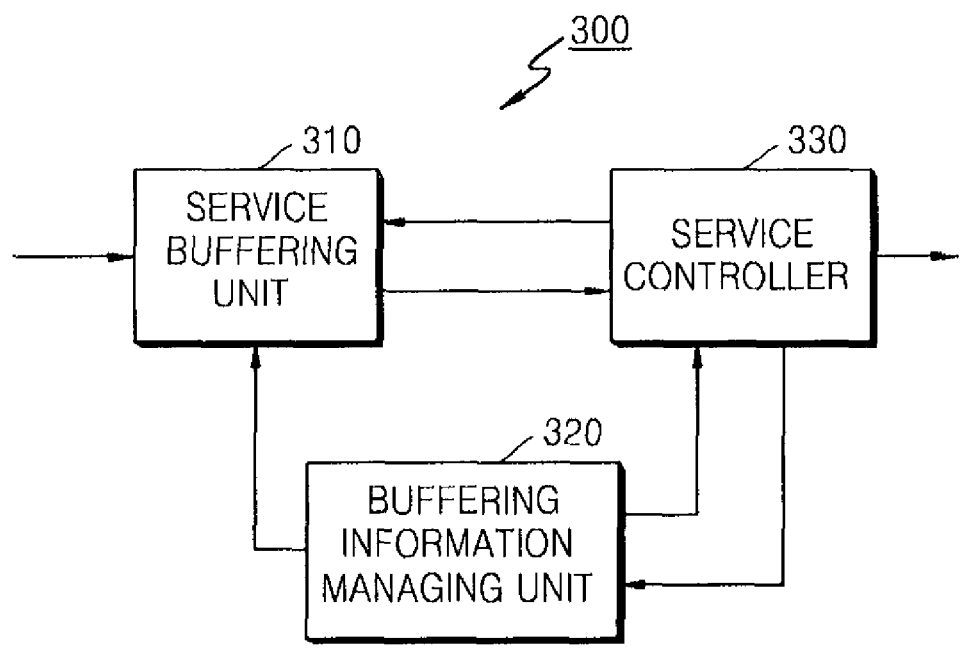
FIG. 3 is a block diagram of a digital multimedia recording apparatus according to an embodiment of the present invention.

FIG. 3 is a block diagram of a digital multimedia recording apparatus 300 according to an embodiment of the present invention.

Referring to FIG. 3, the digital multimedia recording apparatus 300 comprises a service buffering unit 310, a buffering information managing unit 320, and a service controller 330. The digital multimedia recording apparatus 300 may realize output modes including a time shift mode and a background mode.

The service buffering unit 310 buffers received multimedia services so as to output each multimedia service in one of the output modes including the time shift mode and the background mode, and sends the buffered multimedia services to the service controller 330.

When the digital multimedia recording apparatus 300 follows the IPTV (Internet Protocol Television) standard, the digital multimedia recording apparatus 300 may receive multimedia services using an Internet protocol. When the digital multimedia recording apparatus 300 operates in a broadcasting communication environment, the digital multimedia recording apparatus 300 may receive multimedia services in the form of broadcast channels.

Each multimedia service may be processed in the output modes including the time shift mode and the background mode. In the time shift mode, a received and buffered multimedia service may be called and reproduced. In more detail, while a multimedia service being currently buffered is reproduced, a previously buffered multimedia service may be called and reproduced. In the background mode, a currently received multimedia service is buffered and stored while not displayed on a screen. In the background mode, a multimedia service may be recorded according to a user's request.

According to the hardware specifications of the digital multimedia recording apparatus 300, two or more multimedia services may be processed in the time shift mode or two or more multimedia services may be processed in the background mode. Some multimedia services may be processed in the time shift mode and simultaneously other multimedia services may be processed in the background mode. In this case, if a multimedia service is displayed on the screen in the background mode, since the background mode is changed into the time shift mode, the multimedia service may not be simultaneously processed both in the background mode and the time shift mode.

The buffering information managing unit 320 manages buffering information relating to buffering settings of each of the multimedia services buffered by the service buffering unit 310, according to a buffering request of the service controller 330. The buffering information may be sent to the service controller 330. The buffering information managing unit 320 confirms whether a buffering status of each of the multimedia services buffered by the service buffering unit 310 has changed, and includes the confirmation regarding whether the buffering status of each of the multimedia services has changed into the buffering information.

In the present embodiment, the buffering information may be set by each of the output modes and the multimedia services. In more detail, multimedia services having different output modes have different buffering information, and different multimedia services having the same output modes have different buffering information.

The buffering information includes four types of buffering information, such as buffering status information, buffering start request list information, buffering event type information, and buffering event information.

The buffering status information includes at least one of a buffering start request, a buffering start cancelation, a buffering in progress, a buffering initialization, and a buffering failure, as a buffering status of each of the buffered multimedia services. The buffering status information will be described in more detail with reference to FIG. 4 below.

The buffering start request list information includes a buffering list with regard to a buffering start request for the buffered multimedia services sent by the service controller 330. Since the service controller 330 may send the buffering start request for a specific output mode or a specific multimedia service, the buffering start request list information may include an output mode corresponding to the specific mode or a multimedia service corresponding to the specific multimedia service. The buffering start request list information may include the buffering status information.

The buffering event type information includes at least one of information regarding whether a buffering status has changed and whether buffering properties including a buffering service type and buffering continuation time have changed.

The buffering event information includes information about events relating to buffering settings of the buffered multimedia services. The buffering event information may include at least one of the buffering event type information and the buffering start request list information. Therefore, if the buffering event information includes the buffering start request list information, the buffering status information included in the buffering start request list information may be included in the buffering event information.

The service controller 330 receives the buffered multimedia services from the service buffering unit 310, receives the buffering information from the buffering information managing unit 320, and, according to the received buffering information, controls output of a corresponding multimedia service. The service controller 330 may control output of reproduction or recording of a predetermined multimedia service.

A variety of modules for performing a function relating to the multimedia service output control of the service controller 330 may be realized by computer program instructions, a processor of a general-purpose computer, a computer used for a specific purpose, and a programming controllable data processing device for performing a predetermined function of the computer program instructions. The computer program instructions may be stored in a computer memory accessible by a variety of processors or the programming controllable data processing device. Also, the computer program instructions may be loaded to the variety of processors or the programming controllable data processing device.

The service controller 330 may include a buffering information determination module to determine a predetermined operation of processing the buffered multimedia services. The buffering information determination module may determine a processing operation requiring the buffering information and guide the buffering information to a location where the processing operation is performed.

The service controller 330 may further comprise a buffering instruction module to instruct a buffering operation with regard to a predetermined multimedia service of the buffered multimedia services. The buffering operation includes a buffering start and a buffering start cancelation of the predetermined multimedia service.

The buffering instruction module instructs the buffering operation with regard to the predetermined multimedia service. The service buffering unit 310 changes the buffering operation. The buffering information managing unit 320 confirms that the buffering status has changed due to the changed buffering operation, and updates the buffering information according to the changed buffering status. The updated buffering information may be transmitted to the buffering information determination module of the service controller 330.

The service controller 330 may further comprise a buffering event information obtaining module to obtain the buffering event information from the buffering, information input by the buffering information determination module. If the buffering event information obtaining module needs the buffering event information, the buffering information determination module guides the buffering information to the buffering event information obtaining module so that the buffering event information obtaining module can obtain the buffering event information from the buffering information.

The service controller 330 may further comprise a buffering start request list information obtaining module to obtain the buffering start request list information from the buffering information input by the buffering information determination module. If the buffering start request list information obtaining module needs the buffering start request list information, the buffering information determination module guides the buffering information to the buffering event information obtaining module so that the buffering start request list information obtaining module can obtain the buffering start request list information from the buffering information.

The service controller 330 may further comprise a buffering status information obtaining module to obtain predetermined buffering status information from the buffering start request list information obtained from the buffering start request list information obtaining module.

The service controller 330 may further comprise a buffering start request list requiring module to instruct the buffering information managing unit 320 to provide the buffering start request list information. The buffering start request list information, rather than the buffering start request list information included in the buffering event information, is designated, thereby obtaining the buffering start request list information without using the buffering event information.

The buffering information managing unit 320 may confirm whether the service buffering unit 310 receives the buffering start request if the buffering information managing unit 320 receives an instruction to require the buffering start request list information from the service controller 330. If the buffering information managing unit 320 confirms that the service buffering unit 310 receives the buffering start request, the buffering information managing unit 320 updates the buffering start request list information. The updated buffering start request list information is then transmitted to the service controller 330. In this regard, the buffering status information obtaining module of the service controller 330 may obtain the buffering status information about the predetermined multimedia service from the buffering start request list information received from the buffering start request list requiring module.

The buffering information obtaining modules of the service controller 330 may be used to obtain various pieces of buffering information about the buffered multimedia services. The service controller 330 may compare the buffering information included in the service controller 330 with the buffering information obtained from the buffering information managing unit 320 and perform various service control functions based on a result of the comparison, or may not use the buffering information obtained from the buffering information managing unit 320. The process of obtaining the buffering information from the buffering information managing unit 320 or the service controller 330 will be described in more detail with reference to FIGS. 5 and 6 below.

The service controller 330 may control output functions relating to the reproduction or recording of the multimedia services received based on the buffering information from the buffering information managing unit 320.

The service controller 330 may control Output functions when buffering of the multimedia services is instantly discontinued due to an error. If each of a plurality of multimedia service sections is divided into a first section before buffering is discontinued, a second section after buffering is discontinued, and a buffering discontinuation section in which buffering is discontinued, the buffering information managing unit 320 may further include a buffering discontinuation managing unit for managing service discontinuation section information including at least one of discontinuation reason information, discontinuation time information, and discontinuation section location information with regard to the buffering discontinuation section of each multimedia service section.

The service controller 330 may detect the buffering discontinuation section by using the service discontinuation section information and the buffering information, and comprise a time shift reproduction module used to continuously reproduce the multimedia services of the first and second sections, except for the buffering discontinuation section.

When the output mode of the digital multimedia recording apparatus 300 is changed into a recording mode, the service controller 330 may detect the buffering discontinuation section by using the service discontinuation section information and the buffering information, and comprise a division recording module used to record the multimedia services of the first and second sections and the buffering discontinuation section information.

A method of controlling a multimedia service output by the present embodiment will be described in more detail with reference to FIGS. 7A through 9 below.

Figure 4:
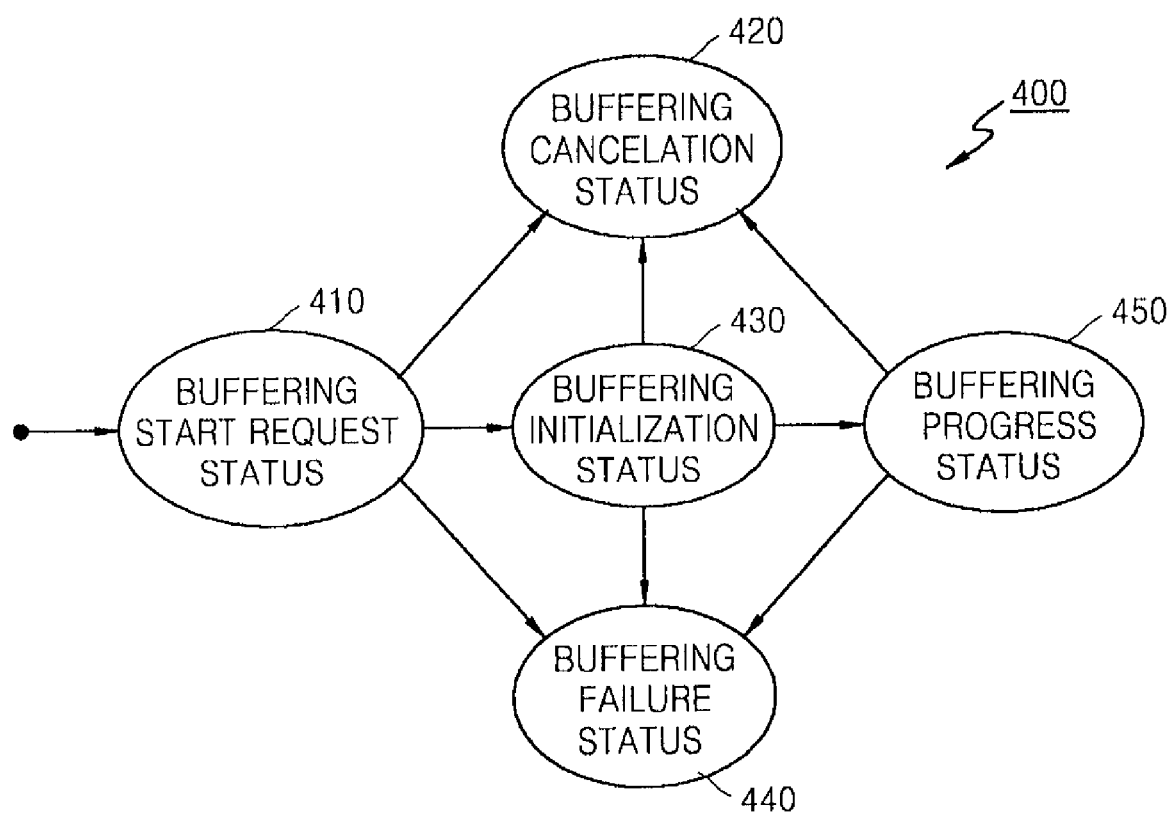
FIG. 4 is a diagram of buffering status information according to an embodiment of the present invention.

FIG. 4 is a diagram of buffering status information 400 according to an embodiment of the present invention. Referring to FIG. 4, the buffering status information 400 includes a current buffering status of each of the output modes and multimedia services. The buffering status information 400 may include five buffering statuses including a buffering start request status 410, a buffering cancelation status 420, a buffering initialization status 430, a buffering failure status 440, and a buffering progress status 450.

In the buffering start request status 410, the starting of corresponding buffering is requested. The corresponding buffering may be started according to a buffering start instruction or request of the service controller 330.

In the buffering cancelation status 420, the corresponding buffering is cancelled. The corresponding buffering may be cancelled according to a buffering cancelation instruction or request of the service controller 330. If the buffering start request is cancelled, the buffering start request status 410 may be changed into the buffering cancelation status 420. If buffering is cancelled after buffering is initialized, the buffering initialization status 430 may be changed into the buffering cancelation status 420. Also, if buffering in progress is cancelled, the buffering progress status 450 may be changed into the buffering cancelation status 420.

In the buffering initialization status 430, buffering is initialized so as to perform buffering. If buffering of which start is requested is capable of starting, the buffering start request status 410 may be changed into the buffering initialization status 430.

In the buffering failure status 440, a buffering operation fails. If buffering has not started in spite of the buffering start request, the buffering start request status 410 may be changed into the buffering failure status 440. If the buffering operation fails although buffering, which has already started, is initialized, the buffering initialization status 430 may be changed into the buffering failure status 440.

In the buffering progress status 450, buffering, which has already started and initialized, is in progress. Therefore, the buffering initialization status 430 may be changed into the buffering progress status 450.

The digital multimedia recording apparatus 300 may determine the buffering status according to the buffering status information 400 and perform a service processing operation requiring information about a current buffering status.

Figure 5:
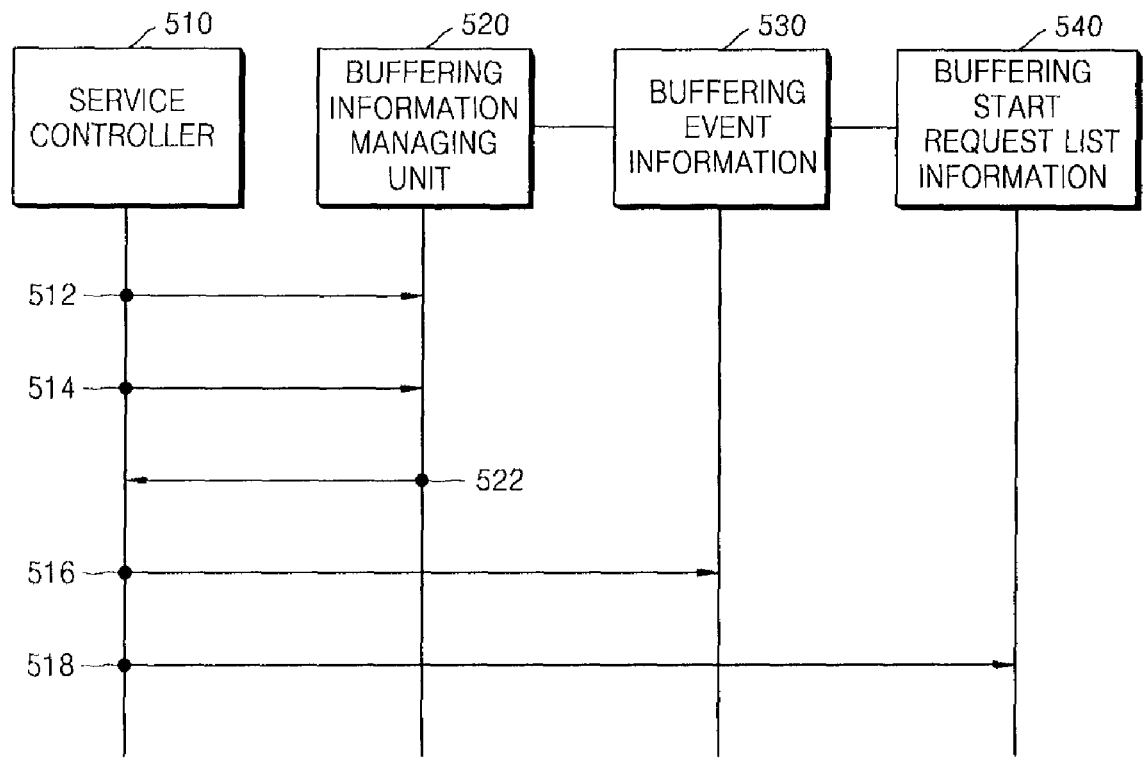
FIG. 5 is a dataflow diagram explaining the relationship between a service controller and a buffering information managing unit with regard to buffering event information, according to an embodiment of the present invention.

FIG. 5 is a dataflow diagram explaining the relationship between a service controller 510 and a buffering information managing unit 520 with regard to buffering event information, according to an embodiment of the present invention. Referring to FIG. 5, the service controller 510 registers a buffering information determination module 512 that is used to determine a predetermined operation for processing buffered multimedia services by using various pieces of buffering information regarding the buffering information managing unit 520 in order to obtain the buffering event information.

The service controller 510 further comprises a buffering instruction module 514 to instruct a buffering operation with regard to a predetermined multimedia service among the multimedia services buffered by the service buffering unit 310.

If the buffering instruction module 514 of the service controller 510 instructs the buffering operation with regard to the predetermined multimedia service, the service buffering unit 310 changes the buffering operation. If the buffering information managing unit 320 confirms that a buffering status has changed according to the changed buffering operation, the buffering information managing unit 320 updates buffering event information 530 according to the changed buffering status. The updated buffering event information 530 is transmitted to the buffering information determination module 512 of the service controller 330 in step 522. In the present embodiment, since the buffering information is regarding the multimedia services of all output modes, the buffering information includes information about the multimedia services in a time shift mode and a background mode.

The buffering information determination module 512 may determine operations requiring various pieces of buffering information, and guide the buffering information to a location where a corresponding operation is performed. If the service controller 510 includes a buffering event information obtaining module 516, the buffering information determination module 512 may transfer the buffering event information 530 to the buffering event information obtaining module 516.

The buffering event information obtaining module 516 may access the buffering event information 530 and request buffering event type information or buffering start request list information 540. If the service controller 510 includes a buffering status information obtaining module 518, the buffering status information obtaining module 518 may access the buffering start request list information 540 and request buffering status information.

Therefore, the service controller 510 may access the buffering information including the buffering event information 530, the buffering event type information, the buffering start request list information 540, and the buffering status information, and obtain buffering information about all buffered multimedia services.

Figure 6:
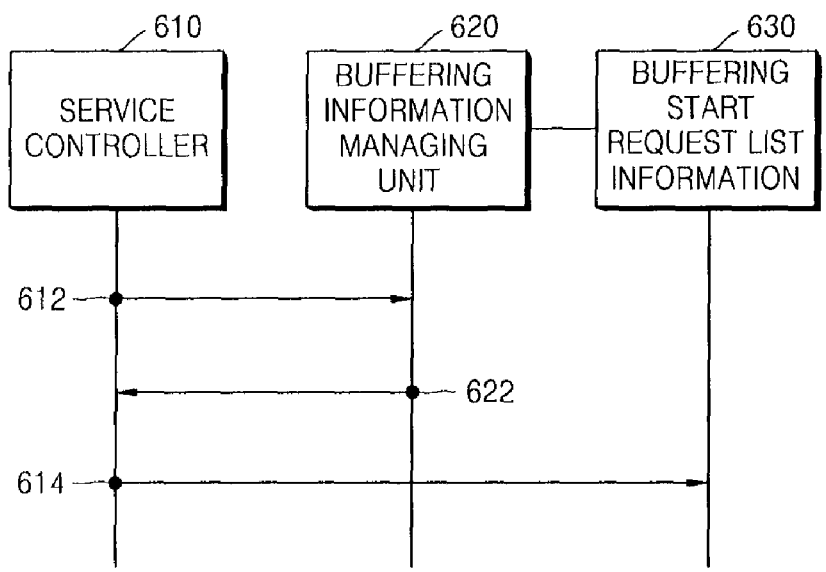
FIG. 6 is a dataflow diagram explaining the relationship between a service controller and a buffering information managing unit with regard to buffering start request list information. according to another embodiment of the present invention.

FIG. 6 is a dataflow diagram explaining the relationship between a service controller 610 and a buffering information managing unit 620 with regard to buffering start request list information, according to another embodiment of the present invention. Referring to FIG. 6, when the service controller 610 needs buffering start request list information 630 without accessing buffering event information, the service controller 610 may comprise a buffering start request list information obtaining module 612. The buffering start request list information obtaining module 612 may request the buffering information managing unit 620 for the buffering start request list information 630. The buffering information managing unit 620 may confirm whether the service buffering unit 310 inputs a buffering start request. If the buffering information managing unit 620 confirms that the service buffering unit 310 inputs the buffering start request, the buffering information managing unit 620 may update the buffering start request list information 630. Therefore, the buffering information managing unit 620 provides the service controller 610 with the updated buffering start request list information 630 in step 622 according to the request for obtaining the buffering start request list information 630.

In this regard, the service controller 610 may comprise a buffering status information obtaining module 614 that may access the buffering start request list information 630 and obtain buffering status information.

Therefore, the service controller 610 may obtain the buffering start request list information 630, confirm an output mode or a multimedia service for which a buffering start request is made, and confirm a buffering status of a desired output mode or multimedia service, without accessing the buffering event information.

Figure 7A:
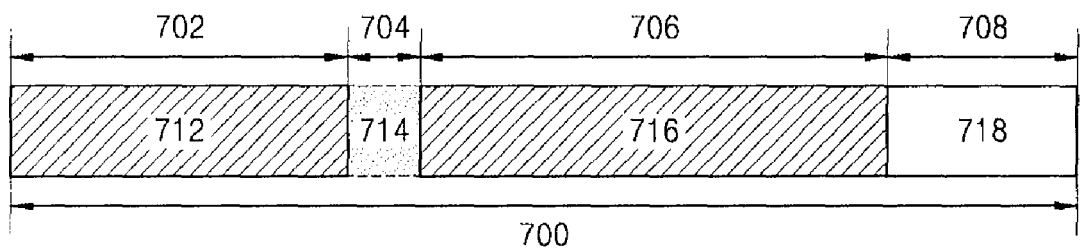
FIG. 7A is a diagram explaining a method of managing a buffering service when buffering is discontinued one time, according to an embodiment of the present invention.

FIG. 7A is a diagram explaining a method of managing a buffering service when buffering is discontinued one time, according to an embodiment of the present invention. Referring to FIG. 7A, a buffering section 700 with regard to a predetermined multimedia service may be divided into three buffered sections 702, 704, and 706 and a non-buffered section 708. The buffered section 704 is a buffering discontinuation section due to a major buffering error. In this case, the buffering information managing unit 320 comprises a buffering discontinuation managing unit for managing the buffered section 704 to which buffering was discontinued (hereinafter referred to as 'buffering discontinuation section). Information about the buffering discontinuation section 704 includes at least one piece of information about the reason for buffering discontinuation, information about multimedia service discontinuation time, and information about a location of a multimedia service discontinuation section.

The information about the reason for buffering discontinuation may be used to completely restore recording or examine a recording error when an output mode of the digital multimedia recording apparatus 300 is changed into a recording mode.

The buffering discontinuation managing unit manages service discontinuation section information 714 including at least one piece of information about the reason for buffering discontinuation, information about buffering discontinuation time, and information about a location of the buffering discontinuation section 704 with regard to the buffering discontinuation section 704, and manages a multimedia service 712 of the buffered section 702 before the buffering discontinuation section 704 and a multimedia service 716 of the buffered section 706 after the buffering discontinuation section 704 as sections of the predetermined multimedia service. Also, the buffering discontinuation managing unit may manage a multimedia service 718 of the non-buffered section 708 as a section of the predetermined multimedia service.

Figure 7B:
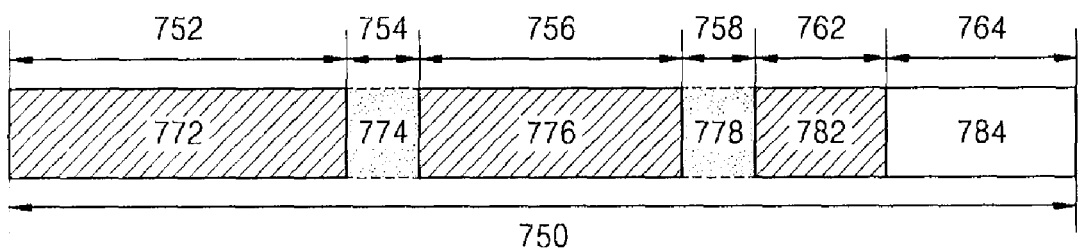
FIG. 7B is a diagram explaining a method of managing a buffering service when buffering is discontinued several times, according to an embodiment of the present invention.

FIG. 7B is a diagram explaining a method of managing a buffering service when buffering is discontinued several times, according to an embodiment of the present invention. Referring to FIG. 7B, a buffering section 750 with regard to a predetermined multimedia service may be divided into a plurality of buffered sections 752, 754, 756, 758, and 762 and a non-buffered section 764. Since buffering discontinuation sections have buffering discontinuation for different reasons, the buffering discontinuation managing unit of the buffering information managing unit 320 generates two pieces of service discontinuation section information 774 and 778 of the buffered sections 754 and 758 to which buffering was discontinued (hereinafter referred to as 'the buffering discontinuation sections 754 and 758'). If the buffering discontinuation sections 754 and 758 have buffering discontinuation for the same reasons, the buffering discontinuation managing unit may manage only information about the reasons for buffering discontinuation among the service discontinuation section information 774 and 778.

Except for the buffering discontinuation sections 754 and 758, multimedia services 772, 776, and 782 of the buffered sections 752, 756, and 762, respectively, may be managed as respective sections of the predetermined multimedia service. A multimedia service 784 of the non-buffered section 764 may be managed as a section of the predetermined multimedia service.

Figure 8:
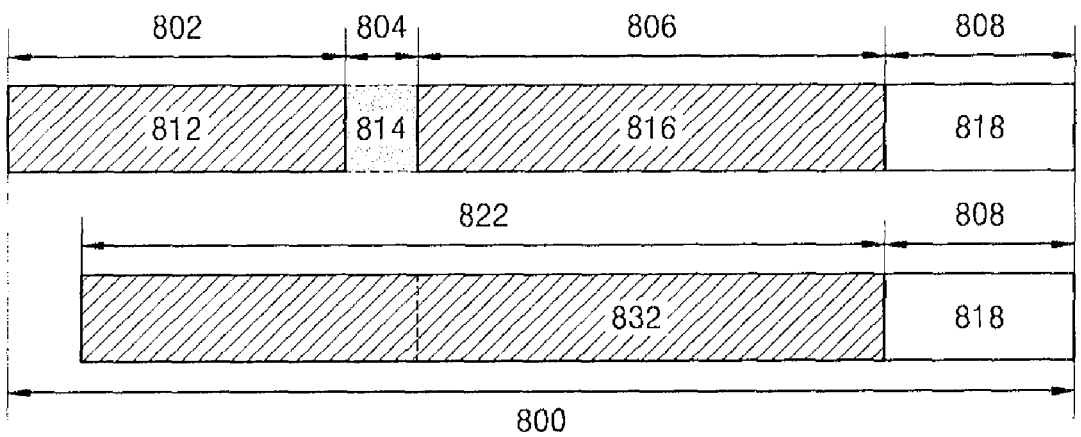
FIG. 8 is a diagram explaining a method of reproducing a buffering discontinuation service section, according to an embodiment of the present invention.

FIG. 8 is a diagram explaining a method of reproducing a buffering discontinuation service section, according to an embodiment of the present invention. Referring to FIG. 8, a buffering section 800 with regard to a predetermined multimedia service is divided into buffered sections 802, 804, and 806 and a non-buffered section 808. The service controller 330 uses buffering information and service discontinuation section information to reproduce the predetermined multimedia service. The buffering information may be used to determine a buffering progress status of a multimedia service in a corresponding output mode and whether the buffering progress status has changed. The service discontinuation section information may be used to know the time or location of a buffering discontinuation section and the reason for buffering discontinuation.

The service controller 330 detects the buffered section 804 as one to which buffering was discontinued (hereinafter referred to as 'buffering discontinuation section 804') by using the buffering information and the service discontinuation section information, and comprises a time shift reproduction module used to connect multimedia services 812 and 816 of the buffered sections 802 and 806 before and after the buffering discontinuation section 804 and reproduce a continuously reconfigured multimedia service 832. Therefore, when the predetermined multimedia service is reproduced in a time shift mode, a multimedia service 832 may be received without buffering discontinuation during a buffered section 822.

The time shift reproduction module may examine or correct the reason for buffering discontinuation by using information about the reason for buffering discontinuation in order to continuously reproduce the multimedia services 812 and 816 of the buffered sections 802 and 806 before and after the buffering discontinuation section 804. After the reconfigured multimedia service 832 is reproduced, a multimedia service 818 of the non-buffered section 808 may be continuously reproduced.

Figure 9:
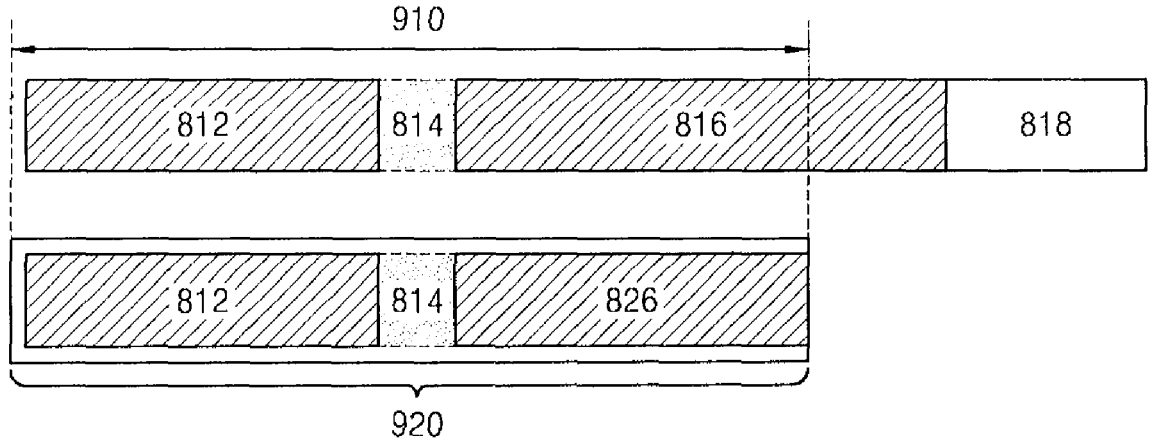
FIG. 9 is a diagram explaining a method of recording a buffering discontinuation service section, according to an embodiment of the present invention.

FIG. 9 is a diagram explaining a method of recording a buffering discontinuation service section, according to an embodiment of the present invention. Referring to FIG. 9, when an output mode of the digital multimedia recording apparatus 300 is changed into a recording mode, a recording request section 910 may overlap a buffering discontinuation section and a buffered section. The service controller 330 detects the buffering discontinuation section by using service discontinuation section information and buffering information in the same manner as reproduction in the time shift mode, and comprises a dividing recording module used to write a multimedia service in sections divided by buffering discontinuation if the buffering discontinuation section is in the recording request section 910. In more detail, the dividing recording module writes service discontinuation section information 814 and a multimedia service 812 of a buffered section, before the service discontinuation section information 814 and multimedia services 812 and 816 included in the recording request section 910, in a multimedia service 816 of a buffered section after the service discontinuation section information 814, as a dividing section 920.

The dividing recording module may not be prevented from accessing a section without a resource due to buffering discontinuation or immediately access the dividing section 920 by using the buffering information and the buffering discontinuation section information.

Figure 10:
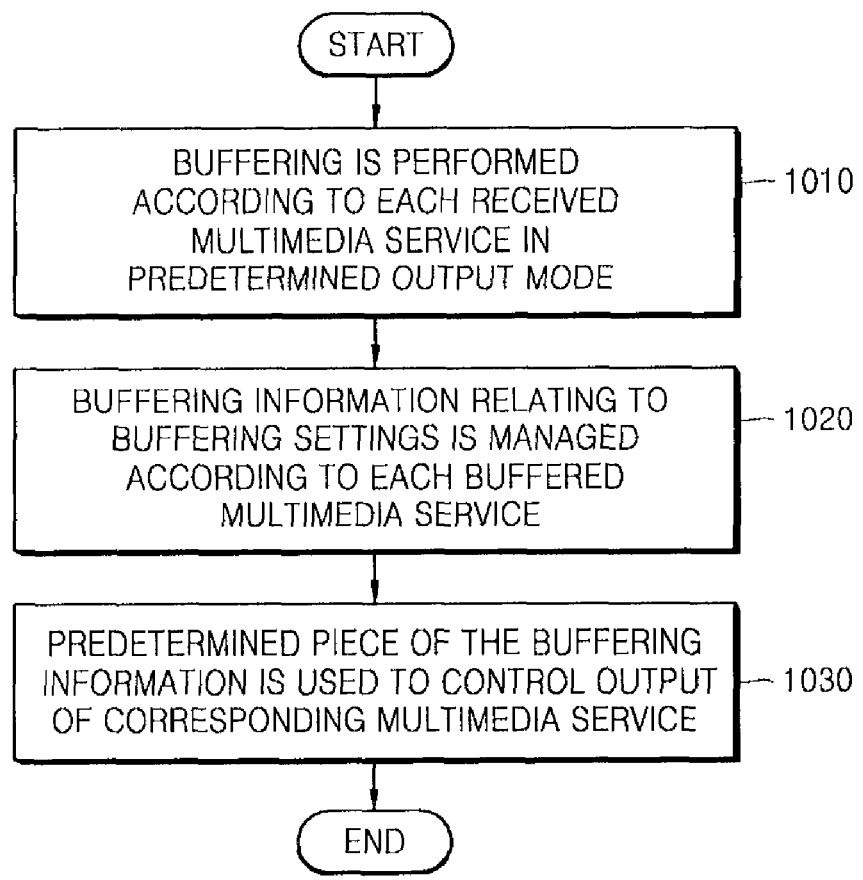
FIG. 10 is a flowchart illustrating a digital multimedia recording method according to an embodiment of the present invention.

FIG. 10 is a flowchart illustrating a digital multimedia recording method according to an embodiment of the present invention. Referring to FIG. 10, in step 1010, buffering is performed according to each of the received multimedia services in a predetermined output mode. Output modes include a time shift mode, a background mode, and a recording mode, and the like.

In step 1020, buffering information relating to buffering settings is managed according to each of the buffered multimedia services.

The buffering information includes buffering event information, buffering event type information, buffering start request list information, and buffering progress status information. The buffering progress status information may be included in the buffering start request list information. The buffering start request list information may be included in the buffering event information. The buffering event type information may be included in the buffering event information.

The buffering information may be updated according to a buffering status of a multimedia service and whether the buffering status has changed, and may be output according to a request for a buffering operation. The buffering start request list information may be output according to a request for the buffering start request list information.

In step 1030, a predetermined piece of the buffering information is used to control output of a corresponding multimedia service. The output of the corresponding multimedia service may be a reproduction mode or a recording mode. The corresponding multimedia service buffered by using various pieces of buffering information may be used to perform output functions, such as reproduction, storing, or recording functions. If the buffering information is provided, an output operation requiring the provided buffering information is determined. Desired buffering information may be detected from the provided buffering information.

When buffering is discontinued due to an instant buffering error, buffering discontinuation section information such as the reason for buffering discontinuation, buffering discontinuation time, buffering discontinuation location and buffering discontinuation information are used to examine whether buffering is discontinued or to correct or restore a buffering discontinuation section, thereby reproducing, storing, or recording the multimedia service.

The present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to embodiments thereof, it will be understood by one of ordinary skill in the art that various changes in form and details may be made therein without departing from the spirit and scope of the present invention as defined by the following claims.

The invention claimed is:

1. A method for recording digital multimedia, the method comprising:
performing buffering with regard to each of a plurality of received multimedia services in a predetermined output mode;
managing buffering information relating to buffering settings with regard to each of the buffered multimedia services; and
controlling output of a corresponding multimedia service according to the buffering information,
wherein the output mode includes a time shift mode where a previously buffered multimedia service is called and reproduced and a background mode where a currently received multimedia service is buffered without being displayed on a screen.

2. The method of claim 1, wherein the buffering information includes buffering progress status information with regard to each of the buffered multimedia services, and
wherein the buffering progress status information comprises at least one of a buffering start request, a buffering start cancellation, a buffering in progress, a buffering initialization, and a buffering failure as a buffering progress status of the corresponding multimedia service.

3. The method of claim 2, wherein the buffering information includes buffering start request list information comprising a list of multimedia services for which a buffering start request is made among the buffered multimedia services, and
wherein the buffering start request list information comprises the buffering progress status information with regard to each of the multimedia services.

4. The method of claim 1, wherein the buffering information includes buffering event information with regard to the buffered multimedia services, and
wherein the buffering event information comprises buffering event type information about whether at least one of a buffering status, a buffering service type, and buffering continuation period of time with regard to each of the multimedia services is changed.

5. The method of claim 3, wherein the buffering information includes buffering event information with regard to the buffered multimedia services, and
wherein the buffering event information comprises the buffering event type information about whether at least one of the buffering status, the buffering service type, and buffering continuation period of time with regard to each of the multimedia services is changed, and the buffering start request list information.

6. The method of claim 1, further comprising determining a predetermined operation to be processed with regard to the buffered multimedia services by using the buffering information.

7. The method of claim 6, wherein managing the buffering information comprises:
determining whether a buffering status of each of the buffered multimedia services has changed;
if the buffering status has changed, updating the buffering information according to the changed buffering status; and
outputting the updated buffering information.

8. The method of claim 4, wherein controlling the output of the corresponding multimedia service comprises:
obtaining the buffering event information from the buffering information,
wherein the buffering event information comprises the buffering event type information about whether at least one of the buffering status, the buffering service type, and buffering continuation period of time with regard to each of the multimedia services is changed.

9. The method of claim 3, wherein controlling the output of the corresponding multimedia service further comprises:
obtaining the buffering start request list information comprising the list of multimedia services for which the buffering start request is made among the buffered multimedia services from the buffering information.

10. The method of claim 9, wherein controlling the output of the corresponding multimedia service further comprises:
obtaining buffering progress status information with regard to a predetermined multimedia service from the buffering start request list information,
wherein the buffering start request list information comprises the buffering progress status information with regard to each of the multimedia services,
wherein the buffering progress status information comprises at least one of a buffering start request, a buffering start cancellation, a buffering in progress, a buffering initialization, and a buffering failure as a buffering progress status of a corresponding multimedia service.

11. The method of claim 10, wherein managing the buffering information comprises:
if a predetermined buffering start request input is confirmed, updating buffering start request list information; and
outputting the updated buffering start request list information,
wherein the buffering start request list information comprises a list of multimedia services for which the buffering start request is made among the buffered multimedia services.

12. The method of claim 11, wherein controlling the output of the corresponding multimedia service further comprises:
obtaining buffering progress status information with regard to a predetermined multimedia service from the buffering start request list information,
wherein the buffering start request list information comprises the buffering progress status information with regard to each of the multimedia services,
wherein the buffering progress status information comprises at least one of a buffering start request, a buffering start cancellation, a buffering in progress, a buffering initialization, and a buffering failure as a buffering progress status of a corresponding multimedia service.

13. The method of claim 10, wherein managing the buffering information comprises:
service discontinuation section information comprising at least one of information about a reason for buffering discontinuation, information about buffering discontinuation time, and information about a buffering discontinuation section location in a buffering discontinuation section, if a predetermined multimedia service is divided into a first section before the buffering discontinuation section, a second section after the buffering discontinuation section, and the buffering discontinuation section due to an instant buffering error.

14. The method of claim 13, wherein controlling the output of the corresponding multimedia service further comprises:
detecting the buffering discontinuation section by using the service discontinuation section information and the buffering information; and
continuously reproducing a multimedia service in the first section, and a multimedia service in the second section, except for the buffering discontinuation section.

15. The method of claim 13, wherein controlling the output of the corresponding multimedia service further comprises:
detecting the buffering discontinuation section by using the service discontinuation section information and the buffering information; and
writing the multimedia service in the first section, the multimedia service in the second section, and information about the buffering discontinuation section.

16. An apparatus for recording digital multimedia, the apparatus comprising:
a service buffering unit performing buffering with regard to each of a plurality of received multimedia services in a predetermined output mode;
a buffering information managing unit managing buffering information relating to buffering settings with regard to each of the buffered multimedia services; and
a service controller controlling output of a corresponding multimedia service according to the buffering information,
wherein the output mode includes a time shift mode where a previously buffered multimedia service is called and reproduced and a background mode where a currently received multimedia service is buffered without being displayed on a screen.

17. The apparatus of claim 16, wherein the buffering information includes buffering progress status information with regard to each of the buffered multimedia services, and
wherein the buffering progress status information comprises at least one of a buffering start request, a buffering start cancellation, a buffering in progress, a buffering initialization, and a buffering failure as a buffering progress status of the corresponding multimedia service.

18. The apparatus of claim 17, wherein the buffering information includes buffering start request list information comprising a list of multimedia services for which a buffering start request is made among the buffered multimedia services, and
wherein the buffering start request list information comprises the buffering progress status information with regard to each of the multimedia services.

19. The apparatus of claim 18, wherein the buffering information includes buffering event information with regard to the buffered multimedia services, and
wherein the buffering event information comprises buffering event type information about whether at least one of a buffering status, a buffering service type, and a buffering continuation period of time with regard to each of the multimedia services is changed.

20. The apparatus of claim 19, wherein the buffering information includes buffering event information with regard to the buffered multimedia services, and
wherein the buffering event information comprises the buffering event type information about whether at least one of the buffering status, the buffering service type, and the buffering continuation period of time with regard to each of the multimedia services is changed, and the buffering start request list information.

21. The apparatus of claim 19, further comprising a buffering information determination module determining a predetermined operation to be processed with regard to the buffered multimedia services by using the buffering information.

22. The apparatus of claim 21, wherein the service controller further comprises a buffering instruction module instructing the service buffering unit for a buffering operation with regard to a predetermined multimedia service among the buffered multimedia services.

23. The apparatus of claim 21, wherein the buffering information managing unit determines whether a buffering status of each of the buffered multimedia services has changed, and if the buffering status has changed, updates the buffering information according to the changed buffering status, and transmits the updated buffering information to the buffering information determination module.

24. The apparatus of claim 23, wherein the service controller further comprises a buffering event information obtaining module receiving the buffering information from the buffering information determination module and obtaining buffering event information from the buffering information, and
wherein the buffering event information comprises the buffering event type information about whether at least one of the buffering status, the buffering service type, and the buffering continuation period of time with regard to each of the multimedia services is changed.

25. The apparatus of claim 23, wherein the service controller further comprises a buffering start request list information obtaining module receiving the buffering information from the buffering information determination module, and obtaining the buffering start request list information comprising the list of multimedia services for which the buffering start request is made among the buffered multimedia services from the buffering information.

26. The apparatus of claim 17, wherein the service controller further comprises a buffering progress status information obtaining module obtaining buffering progress status information with regard to a predetermined multimedia service from the buffering start request list information,
wherein the buffering start request list information comprises the buffering progress status information with regard to each of the multimedia services, and
wherein the buffering progress status information comprises at least one of a buffering start request, a buffering start cancellation, a buffering in progress, a buffering initialization, and a buffering failure as a buffering progress status of a corresponding multimedia service.

27. The apparatus of claim 16, wherein the service controller further comprises a buffering start request list requiring module instructing the buffering information managing unit to provide buffering start request list information.

28. The apparatus of claim 27, wherein the buffering information managing unit, if the service controller inputs a request instruction regarding the buffering start request list information, determines whether a buffering start request is input into the service buffering unit, and if it is determined that the buffering start request is input into the service buffering unit, updates the buffering start request list information, and transmits the buffering start request list information to the service controller.

29. The apparatus of claim 28, wherein the service controller further comprises a buffering progress status information obtaining module obtaining buffering progress status information with regard to a predetermined multimedia service from the buffering start request list information, wherein the buffering start request list information comprises the buffering progress status information with regard to each of the multimedia services, and wherein the buffering progress status information comprises at least one of a buffering start request, a buffering start cancellation, a buffering in progress, a buffering initialization, and a buffering failure as a buffering progress status of a corresponding multimedia service.

30. The apparatus of claim 16, wherein the buffering information managing unit comprises a buffering discontinuation managing unit comprising service discontinuation section information comprising at least one of information about a reason for buffering discontinuation, information about buffering discontinuation time, and information about a buffering discontinuation section location in a buffering discontinuation section, if a predetermined multimedia service is divided into a first section before the buffering discontinuation section, a second section after the buffering discontinuation section, and the buffering discontinuation section due to an instant buffering error.

31. The apparatus of claim 30, wherein the service controller further comprises a time shift reproduction module detecting the buffering discontinuation section by using the service discontinuation section information and the buffering information, and continuously reproducing a multimedia service in the first section, and a multimedia service in the second section, except for the buffering discontinuation section.

32. The apparatus of claim 30, wherein the service controller further comprises a dividing recording module detecting the buffering discontinuation section by using the service discontinuation section information and the buffering information, and writing the multimedia service in the first section, the multimedia service in the second section, and information about the buffering discontinuation section.

33. A non-transitory computer readable recording medium having recorded thereon a program for executing a method for recording digital multimedia, comprising:

a first code segment for performing buffering with regard to each of a plurality of received multimedia services in a predetermined output mode;

a second code segment for managing buffering information relating to buffering settings with regard to each of the buffered multimedia services; and a third code segment for controlling output of a corresponding multimedia service according to the buffering information, wherein the output mode includes a time shift mode where a previously buffered multimedia service is called and reproduced and a background mode where a currently received multimedia service is buffered without being displayed on a screen.

* * * * *

UNITED STATES PATENT AND TRADEMARK OFFICE
CERTIFICATE OF CORRECTION

| | | |
|---|---|---|
| PATENT NO. | : 8,385,725 B2 | Page 1 of 1 |
| APPLICATION NO. | : 12/919689 | |
| DATED | : February 26, 2013 | |
| INVENTOR(S) | : Kwang-Hyuk Kim et al. | |

It is certified that error appears in the above-identified patent and that said Letters Patent is hereby corrected as shown below:

On the Title Page, Item (54) and in the specification, column 1, Title:

"METHOD OF THE APPARATUS FOR RECORDING DIGITAL MULTIMEDIA BASED ON BUFFERING STATES OF THE MULTIMEDIA SERVICE"

should be

-- METHOD AND APPARATUS FOR RECORDING DIGITAL MULTIMEDIA BASED ON BUFFERING STATES OF THE MULTIMEDIA SERVICE --

Signed and Sealed this
Twenty-second Day of October, 2013

Teresa Stanek Rea
*Deputy Director of the United States Patent and Trademark Office*